US008949464B2

(12) United States Patent
L'Heureux et al.

(10) Patent No.: US 8,949,464 B2
(45) Date of Patent: Feb. 3, 2015

(54) CLIENT-SIDE HTTP TRANSLATOR

(76) Inventors: Israel L'Heureux, Monaco (MC); Mark D. Alleman, Portland, OR (US)

( * ) Notice: Subject to any disclaimer, the term of this patent is extended or adjusted under 35 U.S.C. 154(b) by 236 days.

(21) Appl. No.: 13/104,522

(22) Filed: May 10, 2011

(65) Prior Publication Data

US 2014/0258461 A1    Sep. 11, 2014

(51) Int. Cl.
*G06F 15/16*    (2006.01)

(52) U.S. Cl.
USPC .......................................................... 709/246

(58) Field of Classification Search
USPC .................. 709/217, 218, 219, 232, 203, 246
See application file for complete search history.

(56) References Cited

U.S. PATENT DOCUMENTS

| | | | |
|---|---|---|---|
| 6,065,043 A | 5/2000 | Domenikos et al. | |
| 6,173,311 B1 | 1/2001 | Hassett et al. | |
| 6,356,529 B1* | 3/2002 | Zarom | 370/231 |
| 2005/0229243 A1* | 10/2005 | Svendsen et al. | 726/12 |
| 2006/0143295 A1* | 6/2006 | Costa-Requena et al. | 709/227 |
| 2007/0185975 A1* | 8/2007 | Cunningham et al. | 709/217 |
| 2009/0060199 A1* | 3/2009 | von Mueller et al. | 380/278 |
| 2009/0182843 A1* | 7/2009 | Hluchyj et al. | 709/219 |
| 2010/0011115 A1* | 1/2010 | Kliland et al. | 709/230 |
| 2010/0146067 A1* | 6/2010 | Tapuska et al. | 709/207 |
| 2010/0325299 A1* | 12/2010 | Rao et al. | 709/230 |
| 2011/0047294 A1* | 2/2011 | Singh et al. | 709/246 |
| 2011/0113250 A1* | 5/2011 | Li et al. | 713/171 |
| 2011/0119323 A1 | 5/2011 | Tani et al. | |
| 2011/0131412 A1* | 6/2011 | Grimsley et al. | 713/168 |
| 2011/0137973 A1* | 6/2011 | Wei et al. | 709/202 |
| 2011/0145391 A1* | 6/2011 | Ivershen | 709/224 |
| 2011/0280257 A1* | 11/2011 | Chakareski et al. | 370/431 |
| 2012/0093150 A1* | 4/2012 | Kini | 370/389 |
| 2012/0144015 A1* | 6/2012 | Jalan et al. | 709/224 |
| 2012/0262753 A1* | 10/2012 | Viccari et al. | 358/1.15 |

OTHER PUBLICATIONS

USPTO Office Action for pending U.S. Appl. No. 13/052,074, notification date Jun. 21, 2013, unpublished.
Israel L'Heureux and Mark D. Alleman, "Server-Side HTTP Translator", Specification for pending U.S. Appl. No. 13/052,074, filed at USPTO Mar. 10, 2011, unpublished.
Israel L'Heureux and Mark D. Alleman, "Server-Side HTTP Translator", Drawings for pending U.S. Appl. No. 13/052,074, filed at USPTO Mar. 10, 2011, unpublished.
Israel L'Heureux and Mark D. Alleman, Response to USPTO Office Action for Pending U.S. Appl. No. 13/052,074, filed at USPTO on Sep. 20, 2013, published by USPTO for US Patent No. 8,667,183.

(Continued)

*Primary Examiner* — Jason Recek
(74) *Attorney, Agent, or Firm* — Michael J. Andri

(57) ABSTRACT

A network communications system and method are disclosed. In at least one implementation, the network communications system includes a network gateway device configured to receive from a client device via a client-side local area network, an HTTP compliant request stream including one or more HTTP compliant requests formatted according to an HTTP compliant application level protocol. The network gateway device is configured to translate the HTTP compliant request stream into an HTTP non-compliant request stream or an encrypted HTTP non-compliant request stream including one or more HTTP non-compliant requests formatted according to an HTTP non-compliant application level protocol. The network gateway device is configured to forward the HTTP non-compliant request stream to one or more server devices via a server-side wide area network.

13 Claims, 4 Drawing Sheets

(56) References Cited

OTHER PUBLICATIONS

Search History Transcript and Search Notes for Pending U.S. Appl. No. 13/052,074, Oct. 7, 2013, published by USPTO for US Patent No. 8,667,183.

Notice of Allowance for Pending U.S. Appl. No. 13/052,074, Oct. 7, 2013, published by USPTO for US Patent No. 8,667,183.

Israel L'Heureux and Mark D. Alleman, Preliminary Amendment for Pending U.S. Appl. No. 14/197,019, filed at USPTO on Jun. 3, 2014, unpublished.

* cited by examiner

  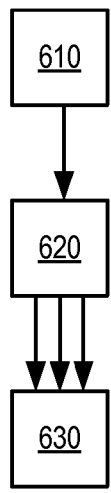
FIG. 4    FIG. 5    FIG. 6
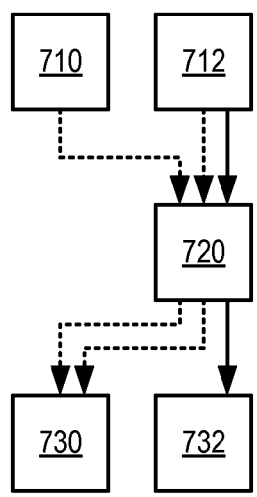 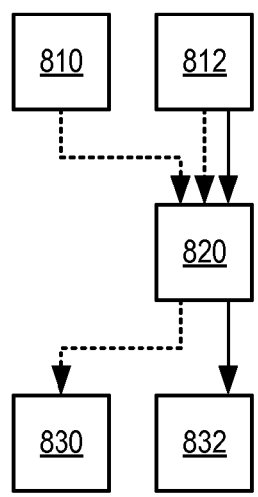 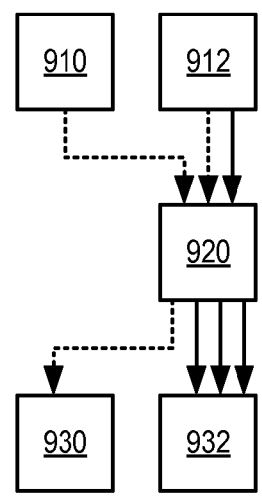
FIG. 7    FIG. 8    FIG. 9

CLIENT-SIDE HTTP TRANSLATOR

BACKGROUND

Information networks such as the Internet typically rely on communication protocols for coordinating information flows between computing devices on the network. The Hypertext Transfer Protocol (HTTP) is a commonly used application level protocol for communicating on the Internet within the Transmission Control Protocol (TCP) or User Datagram Protocol (UDP) transport layer of the Internet Protocol Suite. Recent advancements in application level protocols within the TCP framework, such as SPDY, HTTP-MPLEX, and others, and within the UDP framework, such as Asynchronous Reliable Delivery Protocol (ARDP), may not be supported by HTTP compliant clients. Thus, clients and servers may be unable to effectively communicate with each other or communications may be suboptimal if different or unsupported application level protocols are utilized among these clients and servers. For website operators and software developers, updating clients and servers to support such enhanced application level protocols can be prohibitively costly and time consuming, driving up costs for end users. As a result, a patchwork of interoperability exists for such enhanced protocols, which slows their adoption.

SUMMARY

A client-side HTTP translator is disclosed in the context of a network communications system and method. In at least one implementation, the network communications system includes a network gateway device. The network gateway device may be configured to receive from a client device via a client-side local area network, an HTTP compliant request stream including one or more HTTP compliant requests formatted according to an HTTP compliant application level protocol. The network gateway device may be configured to translate the HTTP compliant request stream into an encrypted HTTP non-compliant request stream including one or more HTTP non-compliant requests formatted according to an HTTP non-compliant application level protocol. The network gateway device may be configured to forward the HTTP non-compliant request stream to one or more server devices via a server-side wide area network. Claimed subject matter, however, is not limited by this summary as other implementations may be disclosed by the following written description and associated drawings.

BRIEF DESCRIPTION OF DRAWINGS

FIGS. 4-9 are schematic diagrams depicting example modes of operation of the example network communications system and method of FIGS. 1 and 2.

DETAILED DESCRIPTION

A client-side HTTP translator is disclosed which facilitates network communications between client devices that support HTTP compliant application level protocols and server devices that support HTTP non-compliant application level protocols. The client-side HTTP translator may be implemented as a translator module of a network gateway device located between a client-side local area network (LAN) and a server-side wide area network (WAN). The network gateway device may serve a number of client devices of the client side LAN, and may be optionally implemented at or by a client device that is itself configured to function as a network gateway device for one or more other client devices of the client-side LAN.

The network gateway device, for example, may serve as a SPDY proxy, HTTP-MPLEX proxy, ARDP proxy, or a proxy for other suitable enhanced application level protocols not compliant with the HTTP application level protocol. As used herein, an HTTP compliant application level protocol is compliant with the defined HTTP specification, such as RFC 1945/HTTP/1.0 and RFC 2616/HTTP/1.1. Further, SPDY refers to an enhanced application level protocol that has been developed by GOOGLE™, of Santa Clara, Calif. HTTP-MPLEX is a name given to an enhanced application level protocol proposed by Dr. Robert Mattson, Department of Computer Science and Computer Engineering, La Trobe University, Bundoora, Victoria, Australia. ARDP refers to the Asynchronous Reliable Delivery Protocol, which is a UDP protocol developed by John Heidemann et al. of the Information Sciences Institute of the University of Southern California. Such enhanced application level protocols may be referred to as HTTP non-compliant application level protocols.

Figure 1:
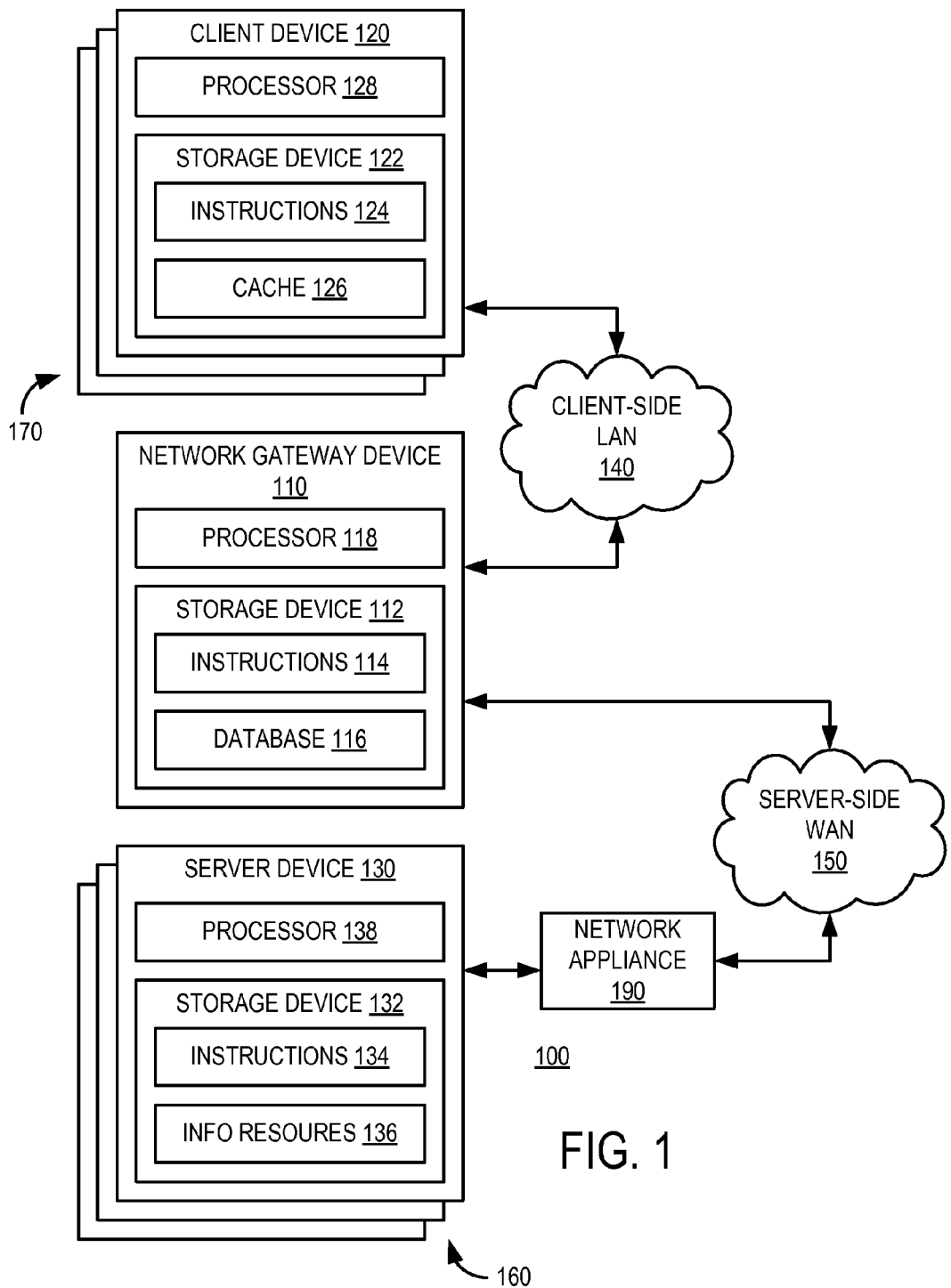
FIG. 1 is a schematic diagram depicting an example network communications system according to one disclosed embodiment.

FIG. 1 is a schematic diagram depicting an example network communications system 100 according to one disclosed embodiment. Network communications system 100 may include a number of computing devices, such as a network gateway device 110, a plurality of client devices 170 including example client device 120, and a plurality of server devices 160 including server device 130. Network gateway device 110 may facilitate network communications between client devices 170 and server devices 160 via respective client-side LAN 140 and server-side WAN 150. In at least some implementations, network gateway device 110 may be configured as or may be integrated with a wired or wireless network/Internet router device. Thus, the networking gateway device 110 may be a modem or wireless router enhanced with mass storage and a processor configured to execute the routines described herein. However, in at least some implementations, network gateway device 110 may itself be a client device (e.g., operable by a human user) of client-side LAN 140.

In at least some implementations, network gateway device 110 may communicate with server device 160 via a network appliance 190. As one example, network appliance 190 may include or may be configured as an application delivery controller and/or load balancer that terminates connections (e.g., is a terminating node) between servers 160 and network gateway device 110. Accordingly, network appliance 190 may be a computing device including one or more processors and a storage device having instructions stored thereon executable by the one or more processors to provide the functionality described herein. For example, network gateway device 110 and network appliance 190 may communicate with each other via server-side WAN 150 using a secure communications protocol (e.g., a TLS protocol or alternative secure protocol) supported by both the network gateway device 110 and network appliance 190.

Network gateway device 110 may include a storage device 112 having instructions 114 stored thereon executable by a processor 118 to perform one or more of the methods, processes, or functions described herein with respect to a network gateway device. Instructions 114 may comprise software and/or firmware of network gateway device 110. As previously stated, network gateway device 110 may be configured as a dedicated wired and/or wireless router. However, in other implementations, network gateway device 110 may be a client device of the client-side LAN. For example, instructions 114 may comprise, at least in part, an operating system of a client device or a portion thereof that runs across all user sessions of the client device. As another example, instructions 114 may comprise, at least in part, an application program (e.g., a browser program) of a client device. As yet another example, instructions 114 may comprise a plug-in of a client device (e.g., a set of instructions executable within a run-time environment of a browser program) to enable the client device to function as the network gateway device described herein.

In at least some implementations, network gateway device 110 may be configured to function (e.g., by executing instructions 114) as an intermediate networking device (e.g., a wired and/or wireless router) positioned in a network path between a client device and a server, which provides proxy functionality for SPDY or other suitable enhanced application level protocols not compliant with the HTTP application level protocol. As one example, instructions 114 may include an HTTP translator module for translating between HTTP compliant and HTTP non-compliant data streams as described in greater detail with reference to FIG. 3. Instructions 114 may further include one or more other suitable modules for providing additional functionality beyond HTTP translation, including routing functions, encryption/decryption functions, buffering, etc.

In at least some implementations, network gateway device 110 may be configured to function as a terminating network node. For example, TCP and/or TLS (transport level security) (e.g., SSL (secure socket layer)) connections between client device 120 and server device 130 may terminate at network gateway device 110. Network gateway device 110 may have its own IP address in at least some implementations. On the client-side of network gateway device 110, TCP and/or TLS connections of client-side LAN 140 with respective client devices 170 may terminate at network gateway device 110. On the server-side of network gateway device 110, TCP and/or TLS connections of server-side WAN 150 may terminate at server devices 160 (or alternatively at network appliance 190) and at network gateway device 110. Network gateway device 110 may be configured to inspect, modify, reject, route, or re-route requests and responses between client devices 170 and server devices 160 that utilize TCP and/or TLS protocols.

As a non-limiting example, network gateway device 110 may facilitate or support client-side local area network 140 having one or more client devices 170. For example, network gateway device 110 may be configured to receive from one or more client devices 170 via client-side local area network 140, one or more HTTP compliant request streams. Each HTTP compliant request stream may include one or more HTTP compliant requests formatted according to an HTTP compliant application level protocol by a respective client device. Network gateway device 110 may be configured to translate the one or more HTTP compliant request streams into one or more HTTP non-compliant request streams addressed to one or more server devices 160. Each HTTP non-compliant request stream may include one or more HTTP non-compliant requests formatted according to an HTTP non-compliant application level protocol, such as SPDY, for example. Network gateway device 110 may be configured to route (e.g., send or forward) the one or more HTTP non-compliant request streams to the one or more server devices 160 via server-side wide area network 150.

Network gateway device 110 may be further configured to receive from the one or more server devices 160 via server-side wide area network 150, one or more HTTP non-compliant response streams. Each HTTP non-compliant response stream may include one or more HTTP non-compliant responses formatted according to the HTTP non-compliant application level protocol. Network gateway device 110 may be configured to translate the one or more HTTP non-compliant response streams into one or more HTTP compliant response streams addressed to the one or more client devices 170. Each HTTP compliant response stream may include one or more HTTP compliant responses formatted according to the HTTP compliant application level protocol. Network gateway device 110 may be configured to route (e.g., send or forward) the one or more HTTP compliant response streams to the one or more client devices 170 via client-side local area network 140.

Client device 120 may include a storage device 122 having instructions 124 stored thereon executable by a processor 128 to perform one or more of the methods, processes, or functions described herein with respect to a client device. Instructions 124 of client device 120 may include a browser program (e.g., web browser or file browser) for requesting, processing, and presenting information resources obtained from server devices 160. A browser program of client device 120 may support one or more HTTP compliant application level protocols in addition to or exclusive of an HTTP non-compliant application level protocol supported by server device 130. As one example, a browser program of instructions 124 may be configured to send HTTP compliant requests over an HTTP compliant application level protocol specified number of TCP connections (e.g., up to six TCP connections) with another network device such network gateway device 110 or server devices 160. Network gateway device 110 may be configured to establish one or more TCP connections with client device 120 in response to receiving a TCP establishment request from client device 120 via client-side LAN 140. Client device 120 may be configured as, for example, a personal computer, mobile device, or other suitable electronic device that may be operated by a human user.

Server device 130 may include a storage device 132 having instructions 134 stored thereon executable by a processor 138 to perform one or more of the methods, processes, or functions described herein with respect to a server device. As one example, server device 130 may be configured to receive requests for information resources 136 stored at server device 130, and respond to such requests with the requested information resources. Server device 130 may support an HTTP non-compliant application level protocol in addition to or exclusive of an HTTP compliant application level protocol. Server device 130 may be configured to establish one or more TCP connections with network gateway device 110 in response to receiving a TCP establishment request from network gateway device 110 via server-side WAN 150. Server device 150 may be an Internet server and server-side WAN 150 may include the Internet or portion thereof, for example.

Figure 2:
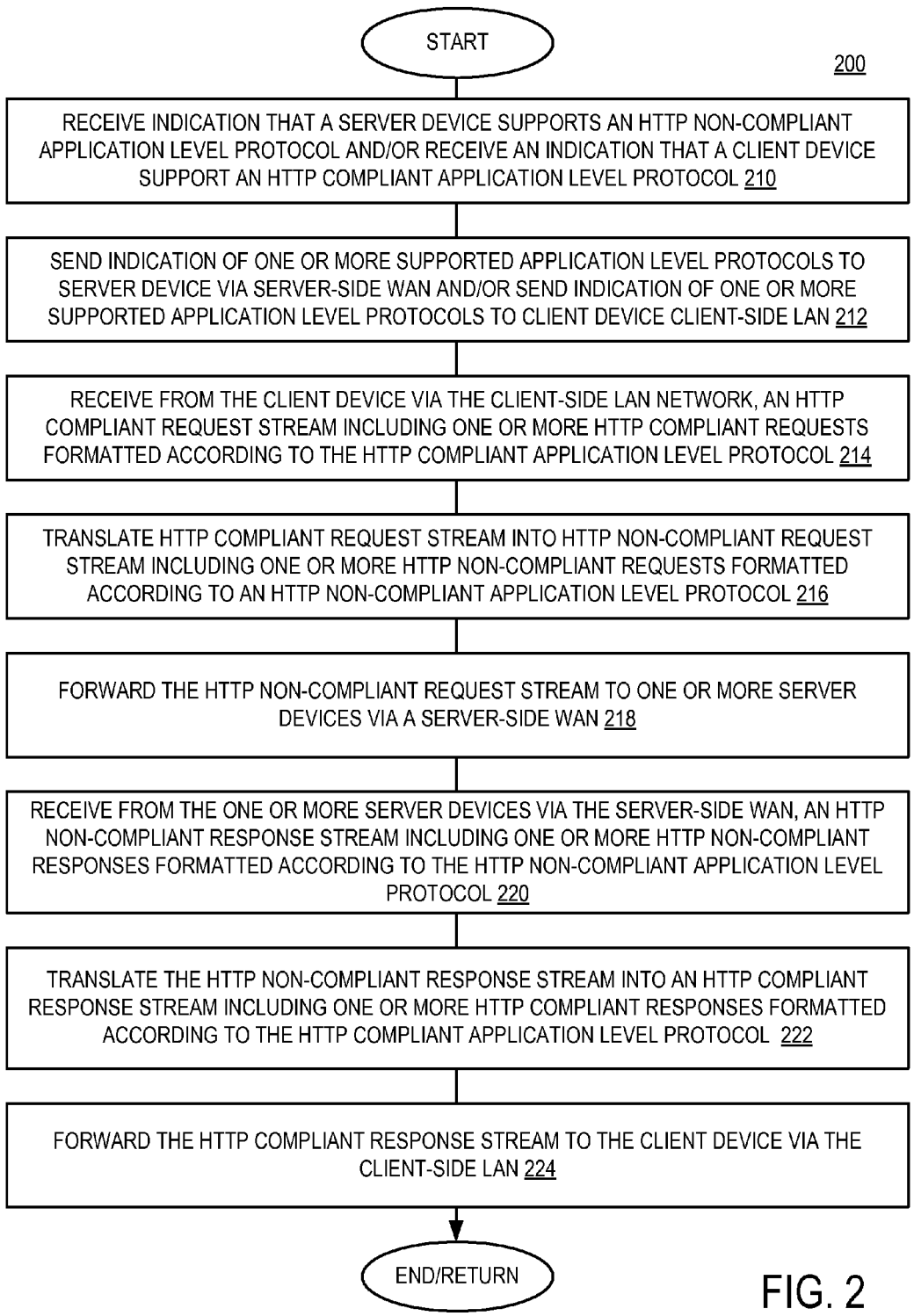
FIG. 2 is a flow diagram depicting an example network communications method according to one disclosed embodiment.

FIG. 2 is a flow diagram depicting an example network communications method 200 according to one disclosed embodiment. As one example, method 200 may be performed, at least in part, by previously described network gateway device 110 of FIG. 1. Accordingly, method 200 may be implemented as instructions (e.g., instructions 114) executed by a processor of a network gateway device or other suitable computing device, in at least some implementations.

At 210, the method may include receiving an indication that a server device supports an HTTP non-compliant application level protocol and/or an indication that a client device supports an HTTP compliant application level protocol. For example, a browser program at the client device may support an HTTP compliant application level protocol, and a server device may support an HTTP non-compliant application level protocol such as SPDY. The request may be received from the server device via a server load balancer, application delivery controller, or other intermediate networking appliance.

An indication that the client device supports the HTTP compliant application level protocol may be received as part of an initial TCP connection establishment request or as part of an HTTP compliant request received from the client device via a client-side LAN. The indication that the client device supports an HTTP compliant application level protocol may be received as a message that includes one or more of an IP address of the client device, client specific ID number or token, etc. and/or browser program identifier (e.g., browser program type and/or version number).

An indication that the server device supports the HTTP non-compliant application level protocol may be received as part of an initial TCP connection establishment response or as part of a response received from the server device. Such a response may include an HTTP non-compliant response, or an initial HTTP compliant response, for example, if the server device also supports an HTTP compliant application level protocol. The indication that the server device supports the HTTP non-compliant application level protocol may be received as a message that includes one or more of an IP address of the server device, a Universal Resource Locator (URL) or other information resource identifier of a information resource residing at the server device, a server specific ID number or token, or other suitable identifier.

The indication received from the client device may be stored at a database in association with the client identifier or browser program identifier where it may be available for reference. For subsequent sessions, for example, the database may be referenced to receive the indication that the client device supports the HTTP compliant application level protocol rather than or in addition to receiving the indication from the client device. Similarly, the indication received from the server device may be stored in a database in association with the server identifier or information resource identifier where it may be referenced to identify whether the server device supports the HTTP non-compliant application level protocol. Accordingly, the particular application level protocol supported by each of the client device and the server device may be identified from indications provided in previous sessions based on information contained in a database.

At 212, the method may include sending an indication of one or more supported application level protocols (e.g., supported by the network gateway device) to the client device via the client-side LAN and/or sending an indication of one or more supported application level protocols (e.g., supported by the network gateway device) to the server device via the server-side WAN. As one example, the previously described network gateway device may select one or more application level protocols from the one or more application protocols supported by the client device and/or server device based on the indications received at 210.

The network gateway device may send a message that indicates one or more supported application level protocols to the client device via the client-side LAN. The client device may receive the indication of the one or more supported application level protocols, and may send requests for information resources that are formatted according to a select one of the supported application level protocols. Similarly, the network gateway device may send a message that indicates one or more supported application level protocols to the server device via the server-side WAN. The server device receives the indication of the one or more supported application level protocols, and may send responses formatted according to a select one of the supported application level protocols. The responses may include the information resources requested by the client device via the network gateway server.

At 214, the method includes receiving a request stream from the client device via the client-side LAN over one or more TCP connections with the client device. In at least some implementations, the request stream may include an HTTP compliant request stream including one or more HTTP compliant requests formatted according to an HTTP compliant application level protocol. The HTTP compliant request stream may include multiple HTTP compliant requests received in parallel or series from the client device over one or more TCP connections. The method at 214 may further include receiving a plurality of request streams (e.g., HTTP compliant request streams) from a plurality of client devices via the client-side LAN. The one or more requests of each request stream may include requests for information resources residing at one or more server devices At 216, the method includes translating the HTTP compliant request stream into an HTTP non-compliant request stream including one or more HTTP non-compliant requests formatted according to an HTTP non-compliant application level protocol. In at least some implementations, translating the HTTP compliant request stream into the HTTP non-compliant request stream may include multiplexing or demultiplexing the HTTP compliant request stream from an HTTP compliant application level protocol specified number of TCP connections of the client-side LAN to an HTTP non-compliant application level protocol specified number of TCP connections of the server-side WAN. For example, an HTTP compliant request stream received from a client device over six TCP connections via the client-side LAN may be multiplexed for transmission to a server device over a lesser number of TCP connections (e.g., a single TCP connection in the case of SPDY) via the server-side WAN.

In at least some implementations, translating the HTTP compliant request stream into the HTTP non-compliant request stream may include compressing respective headers of the one or more HTTP compliant requests to the one or more HTTP non-compliant requests. In at least some implementations, the method may further include decrypting the HTTP compliant request stream prior to translating the HTTP compliant request stream into the HTTP non-compliant request stream.

At 218, the method includes forwarding or sending the HTTP non-compliant request stream to one or more server devices via a server-side WAN. As previously discussed, the one or more HTTP non-compliant requests of the HTTP non-compliant request stream may be sent to the one or more server devices over an application protocol specified number of TCP connections (e.g., a single TCP connection per server device for SPDY). In at least some implementations, the method may further include encrypting or re-encrypting the HTTP non-compliant request stream prior to forwarding or sending the HTTP non-compliant request stream to the one or more server devices. The one or more server devices may receive, decrypt, process, and respond to the one or more HTTP non-compliant requests of the HTTP non-compliant request stream by sending an HTTP non-compliant response stream via the server-side WAN over one or more TCP connections with the network gateway device.

At 220, the method includes receiving from the one or more server devices via the server-side WAN, an HTTP non-compliant response stream including one or more HTTP non-compliant responses formatted according to an HTTP non-compliant application level protocol. The one or more HTTP non-compliant responses may be responsive to the one or more HTTP non-compliant requests sent or forwarded to the one or more server devices by the network gateway device. In at least some implementations, HTTP non-compliant responses may be received from the one or more server devices over the application protocol specified number of TCP connections between the network gateway device and the one or more server devices.

At 222, the method includes translating the HTTP non-compliant response stream into one or more an HTTP compliant response stream including one or more HTTP compliant requests formatted according to the HTTP compliant application level protocol. In at least some implementations, translating the HTTP non-compliant response stream into the HTTP compliant response stream may include multiplexing or demultiplexing the HTTP non-compliant response stream from an HTTP non-compliant application level protocol specified number of TCP connections of the server-side WAN to an HTTP compliant application level protocol specified number of TCP connections of the client-side LAN. For example, an HTTP non-compliant response stream received from a server device over a single TCP connection via the server-side WAN may be demultiplexed for transmission to a client device over a greater number of TCP connections (e.g., two, three, or more TCP connections) via the client-side LAN.

In at least some implementations, translating the HTTP non-compliant response stream into the HTTP compliant response stream may include uncompressing respective headers of the one or more HTTP non-compliant responses to obtain the one or more HTTP compliant responses. In at least some implementations, the method may further include decrypting the HTTP non-compliant response stream prior to translating the HTTP non-compliant response stream into the HTTP compliant response stream.

At 224, the method may include forwarding the HTTP compliant response stream to the client device via the client-side local area network. The client device may receive the HTTP compliant response stream via the client-side LAN, and processes the HTTP compliant response stream at a browser program, for example, that supports the HTTP compliant application level protocol. In at least some implementations, the method may further include encrypting or re-encrypting the HTTP compliant response stream prior to forwarding the HTTP compliant response stream to the client device.

In at least some implementations, method 200 may further include identifying a performance parameter of an existing TCP connection between the network gateway device and the server device, and initiating a new TCP connection with the server device based, at least in part, on the performance parameter of the existing TCP connection exceeding a threshold. The performance parameter may include, for example, one or more of a round trip time, packet loss, TCP receive window, or congestion window. As one example, if the round trip time (e.g., as measured by or at the network gateway device) of a pre-existing TCP connection between the network gateway device and the server device exceeds a threshold round trip time or packet loss exceeds a threshold packet loss, then the network gateway device may open a new TCP connection to the server device. As another example, if the TCP receive window for a given TCP connection (e.g., as measured by or at the client device, and communicated to the network gateway device) is less than a threshold TCP receive window or if a congestion window (e.g., as measured by or at the network gateway device) is less than a threshold congestion window, then the network gateway device may open a new TCP connection to the server device.

Figure 3:
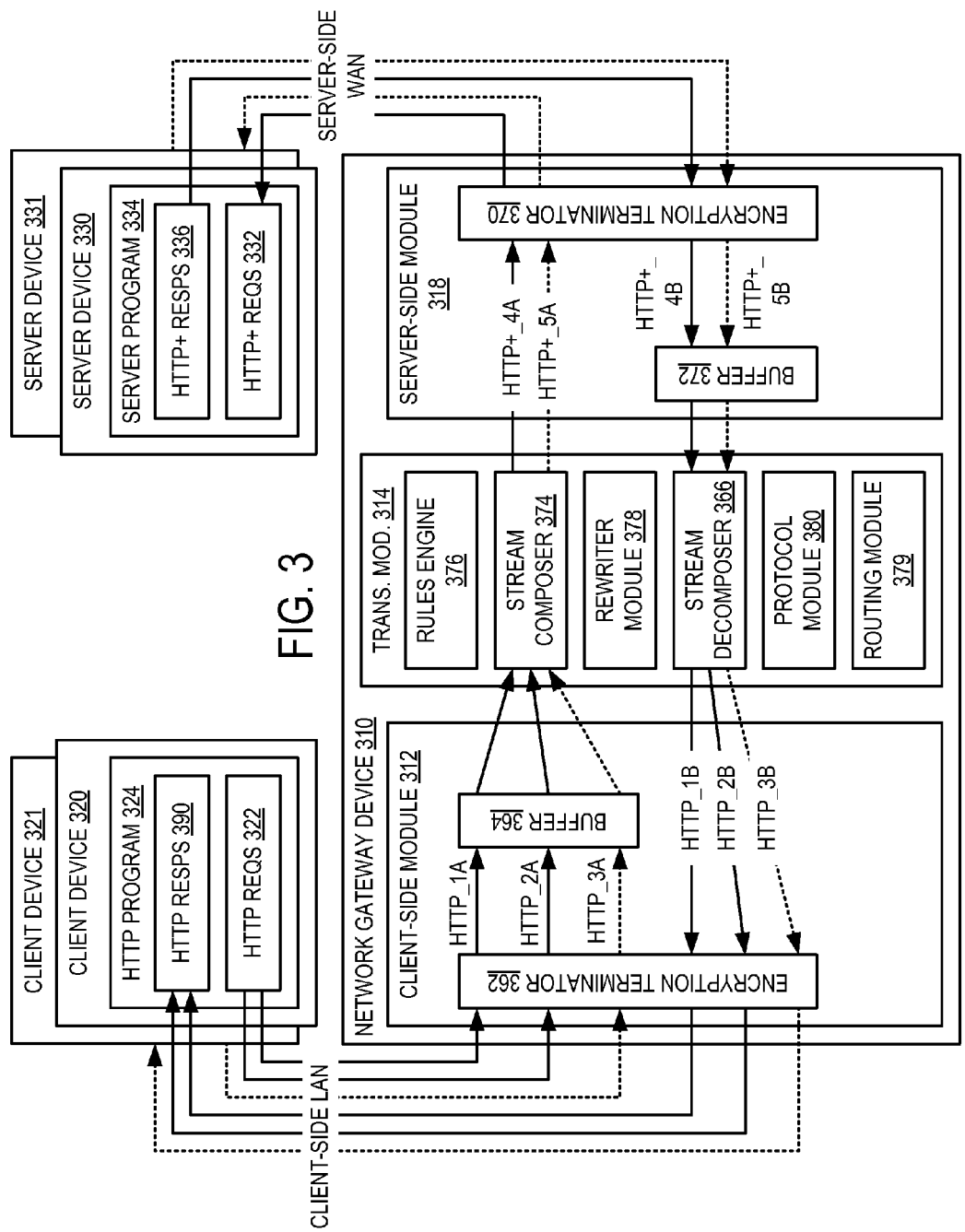
FIG. 3 is a schematic diagram depicting internal details of the example network communications system of FIG. 1 according to one disclosed embodiment.

FIG. 3 is a schematic diagram depicting the internal details of the example network communications system 100 of FIG. 1 according to one disclosed embodiment. FIG. 3 depicts a network gateway device 310 including a client-side module 312, a translator module 314, and a server-side module 318, which may collectively correspond to previously described instructions 114 of network gateway device 110. FIG. 3 depicts two client devices 320, 321 communicating with two server devices 330, 331 via network gateway device 310. Other example modes of operation of network gateway device 310 are described in greater detail with reference to FIGS. 4-9.

In FIG. 3, an HTTP compliant program 324 (i.e., a program enabled to communicate by an HTTP compliant protocol) of client device 320 is depicted sending HTTP compliant requests 322 of an HTTP compliant request stream including two HTTP requests (e.g., HTTP_1A and HTTP_2A) to network gateway device 310, for example, over one or more TCP connections of a client-side LAN. As one example, the request stream may be transmitted by client device 320 sending a first request (HTTP_1A) to network gateway device 310 over a first TCP connection and a second request (HTTP_2A) to network gateway device 310 over a second TCP connection. As another example, the first request (HTTP_1A) may be sent by client device 320 over a TCP connection followed by the second request (HTTP_2A) sent by client device 320 over the same TCP connection. Client device 321 is also depicted sending an HTTP compliant request (e.g., HTTP_3A) to network gateway device 310 via the client-side LAN. In FIG. 3, communications associated with client device 321 are depicted using broken lines to enable such communications to be distinguished from communications associated with client device 320.

Network gateway device 310 receives the HTTP compliant requests at client-side module 312. An encryption terminator 362 of client-side module 312 may be configured to decrypt HTTP compliant requests of an HTTP compliant request stream, for example, if the request stream was encrypted by a client device. Encryption terminator 362 may support any type of encryption. For example, encryption terminator 362 may support SSL (secure socket layer), TLS (transport layer security), or other suitable encryption protocol or secure protocol. Buffer 364 of client-side module 312 may buffer the HTTP compliant requests before the HTTP compliant requests are processed by translator module 314.

Translator module 314 may be configured to translate HTTP compliant requests received via client-side module 312 into HTTP non-compliant requests that may be sent or forwarded to respective server devices. Translator module 314 may comprise a number of modules, including one or more of a rules engine 376, stream composer module 374, rewriter module 378, stream decomposer module 366, protocol module 380, and routing module 379.

Rules engine 376 may be configured to examine HTTP compliant requests and determine whether to apply a particular rule of a defined ruleset, for example, in response to satisfaction of a given condition by an HTTP compliant request. Rules engine 376 may apply such rules by instructing one or more of the other modules of translator module 314.

Stream composer module 374 may be configured to translate an HTTP compliant request stream to an HTTP non-compliant request stream by multiplexing or demultiplexing the HTTP compliant request stream from an HTTP compliant application level protocol specified number of TCP connections (e.g., six TCP connections) received over the client-side LAN to an HTTP non-compliant application level protocol specified number of TCP connections (e.g., a single TCP connection per target server device in the case of SPDY) for the HTTP non-compliant request stream to be sent over the server-side WAN.

For example, FIG. 3 depicts stream composer module 374 multiplexing HTTP compliant requests HTTP_1A and HTTP_2A of an HTTP compliant request stream to HTTP non-compliant request HTTP+_4A of an HTTP non-compliant request stream. As another example, stream composer module 374 may be instructed to demultiplex an HTTP compliant request stream to an HTTP non-compliant request stream having a greater number of TCP connections. For example, exemplary methods that may be used by translator module 314 to increase parallelism in TCP connections are described in co-pending U.S. patent application Ser. No. 13/004,894, entitled INFORMATION RESOURCE MODIFICATION FOR HIGHER NETWORK CONNECTION CONCURRENCE, filed Jan. 12, 2011, the entire disclosure of which is herein incorporated by reference. As yet another example, stream composer module 374 may be instructed not to vary the number of TCP connections between an HTTP compliant request stream received over a client-side LAN and an HTTP non-compliant request stream sent to a server device over a server-side WAN. For example, HTTP compliant request HTTP_3A received over a single TCP connection via the client-side LAN may be translated to HTTP non-compliant request HTTP+_5A sent to server device 331 over a single TCP connection via the server-side WAN. HTTP non-compliant requests HTTP+_4A and HTTP+_5A are examples of enhanced HTTP non-compliant request streams.

Alternatively or additionally, stream composer module 374 may be configured to translate the HTTP compliant request stream to the HTTP non-compliant request stream by compressing respective headers of the one or more HTTP compliant requests to the one or more HTTP non-compliant requests of the HTTP non-compliant request stream. Stream composer module 374 may be configured to receive instructions from rules engine 376 and may perform actions in response thereto or based on default instructions.

Rewriter module 378 may be configured to modify (e.g., rewrite) one or more of a URL, a header, or a data payload of an HTTP compliant request of an HTTP compliant request stream. Rewriter module 378 may modify the HTTP compliant request stream in response to instructions received from rules engine 376 or based on default rules. As one example, rewriter module 378 may be configured to modify respective headers of the HTTP compliant request stream to remove or add an IP address of the originating client device, an IP address of a target server device, a header map, and/or a cookie. Another example of modifying an HTTP compliant request stream includes rejecting certain HTTP compliant requests (e.g., refuse connections originating from or addressed to a particular geographic region or IP address). Rewriter module 378 may modify an HTTP compliant request stream by filtering one or more HTTP compliant requests from the HTTP compliant request stream.

Routing module 379 may be configured to route (e.g., send or forward) requests received from a plurality of client devices to respective target server devices by applying any suitable routing process. Routing module 379 may route communications in response to instructions received from rules engine 376 or based on default rules.

Protocol module 380 may be configured to select an HTTP compliant protocol and/or an HTTP non-compliant protocol to be applied to each of the client-side LAN communications and the server-side WAN communications from a plurality of protocols supported by the network gateway device (e.g., as indicated by the network gateway device at 212 of method 200). Protocol module 380 may select a protocol in response to instructions received from rules engine 376 or based on default rules. Hence, the network gateway device may be configured to translate between a variety of HTTP compliant protocols and a variety of enhanced protocols (e.g., HTTP non-compliant protocols) in at least some implementations.

As one example, protocol module 380 may be configured to receive an indication, such as a message, token, data element, etc., from either client device 320 or server device 330. Protocol module 380 may be configured to store the indication received from client device 120 or server device 330 where it may be referenced by protocol module 380. For subsequent sessions, for example, network gateway device 310 may be configured to receive the indication for the client device or server device from a database based on a client identifier or a server identifier, for example. Network gateway device 110 may be configured to send an indication of one or more supported application level protocols to client device 320 or server device 330. As one example, the indication may be a message sent from the server device to the network gateway device indicating that the server device is able to interpret data sent according to the SPDY protocol or other suitable HTTP non-compliant protocol.

Another encryption terminator 370 of server-side module 318 may be configured to encrypt or re-encrypt the HTTP non-compliant request stream. As similarly described with reference to encryption terminator 362 of the client-side module 312, encryption terminator 370 may support any type of encryption, including SSL, TLS, or other suitable encryption protocol or secure protocol. Server-side module 318 may be configured to send respective requests of HTTP non-compliant request stream to one or more server devices such as server devices 330 and 331, for example, via a server-side WAN. In some implementations, communications may be sent to the one or more server device via an intermediate network appliance, such as previously described network appliance 190. In these implementations, the TLS protocol or other suitable secure protocol applied by encryption terminator 370 may be supported by both network gateway device 310 and the intermediate network appliance. Thus, the secure protocol may be periodically changed according to a message sent from the intermediate network appliance to the network gateway device 310. Further, security is enhanced since the secure protocol may be a proprietary protocol, and/or may be known only to the network gateway device and the intermediate network appliance.

In FIG. 3, the HTTP non-compliant request stream (HTTP+_4A) associated with client device 320 is sent to server device 330 where the HTTP non-compliant request stream is received at server program 334 as HTTP+REQS 332. HTTP non-compliant request stream (HTTP+_5A) associated with client device 321 is sent to server device 331. Server devices 330 and 331 may receive, process, and respond to the one or more HTTP non-compliant requests of the HTTP non-compliant request streams (e.g., at server program 334) by sending respective HTTP non-compliant response streams (e.g., HTTP+_4B and HTTP+_5B) each including one or more HTTP non-compliant responses. For example, HTTP non-compliant responses (e.g., HTTP+RE- SPS 336) generated by server program 334 may be sent to network gateway device 310 via server-side WAN.

HTTP non-compliant response streams (e.g., HTTP+_4B and HTTP+_5B) each including one or more HTTP non-compliant responses may be received by server-side module 318 of network gateway device 310 via the server-side WAN. HTTP non-compliant responses HTTP+_4B and HTTP_+ 5B are examples of an enhanced HTTP non-compliant response stream. Encryption terminator 370 of server-side module 318 may be configured to decrypt the HTTP non-compliant response streams, for example, if the HTTP non-compliant response streams were encrypted by the server devices. A buffer 372 of server-side module 318 may be configured to buffer the HTTP non-compliant response streams.

Translator module 314 may be configured to translate HTTP non-compliant responses received via server-side module 318 into HTTP compliant responses that may be sent or forwarded to respective client devices. Rules engine 376 may be configured to examine HTTP non-compliant responses and determine whether to apply a particular rule of a defined ruleset, for example, in response to satisfaction of a given condition by an HTTP non-compliant response. Rules engine 376 may apply such rules by instructing one or more of the other modules of translator module 314.

Stream decomposer module 366 may be configured to translate an HTTP non-compliant response stream to an HTTP compliant response stream by multiplexing or demultiplexing the HTTP non-compliant response stream from an HTTP non-compliant application level protocol specified number of TCP connections (e.g., a single TCP connection in the case of SPDY) received over the server-side WAN to an HTTP compliant application level protocol specified number of TCP connections (e.g., a greater number of TCP connection per target client device) for the HTTP compliant response stream to be sent over the client-side LAN.

For example, FIG. 3 depicts stream decomposer module 366 demultiplexing HTTP non-compliant response HTTP+_ 4B of an HTTP non-compliant response stream to HTTP compliant responses HTTP_1B and HTTP_2B of an HTTP compliant response stream. As another example, stream decomposer module 366 may be instructed to multiplex an HTTP non-compliant response stream to an HTTP compliant response stream having a greater number of TCP connections. As yet another example, stream composer module 374 may be instructed not to vary the number of TCP connections between an HTTP non-compliant response stream received over a server-side WAN and an HTTP compliant response stream sent to a client device over a client-side LAN. For example, HTTP non-compliant response HTTP+_5B received over a single TCP connection via the server-side WAN may be translated to HTTP compliant response HTTP_3A sent to client device 321 over a single TCP connection via the client-side LAN.

Alternatively or additionally, stream decomposer module 366 may be configured to translate the HTTP non-compliant response stream to the HTTP compliant response stream by uncompressing respective headers of the one or more HTTP non-compliant responses to the one or more HTTP compliant responses of the HTTP compliant response stream. Stream decomposer module 366 may be configured to receive instructions from rules engine 376 and may perform actions in response thereto or based on default instructions.

Rewriter module 378 may be configured to modify (e.g., rewrite) one or more of a URL, a header, or a data payload of an HTTP non-compliant response of an HTTP non-compliant response stream. Rewriter module 378 may modify the HTTP non-compliant response stream in response to instructions received from rules engine 376 or based on default rules. As one example, rewriter module 378 may be configured to modify respective headers of the HTTP non-compliant response stream to remove or add an IP address of the originating client device, an IP address of a target server device, a header map, and/or a cookie. Another example of modifying an HTTP non-compliant response stream includes rejecting certain HTTP non-compliant response (e.g., refuse connections originating from or addressed to a particular geographic region or IP address). Rewriter module 378 may modify an HTTP non-compliant response stream by filtering one or more HTTP non-compliant responses from the HTTP non-compliant response stream.

Routing module 379 may be configured to route responses received from a plurality of server devices to respective target client devices by applying any suitable routing process. Routing module 379 may route communications in response to instructions received from rules engine 376 or based on default rules. Encryption terminator 362 of client-side module 312 may be configured to encrypt or re-encrypt the HTTP compliant response stream. Client-side module 312 may be configured to send respective responses of HTTP compliant response stream to one or more client devices such as client devices 320 and 321, for example, via a client-side LAN. Client device 320, for example, may receive HTTP compliant responses HTTP RESPS 390 (e.g., HTTP_5B) from network gateway device 310.

The protocol translation performed by the network gateway device described herein may provide protocol scrubbing of communications translated by the network gateway device. For example, the network gateway device may exclude, reject, or filter values or elements of the translated communications that are unsupported (e.g., non compliant with the respective protocol specification) by any of the protocols (e.g., HTTP compliant or HTTP non-compliant such as SPDY, etc.) translated to or from by the network gateway device. The values or elements of the communications that are excluded, rejected, or filtered may take the form of attack vectors such as computer viruses, computer worms, malicious software, etc.

FIGS. 4-9 are schematic diagrams depicting example modes of operation of example network communications system 100 of FIG. 1 and example network communications method 200 of FIG. 2.

In FIG. 4, network gateway device 420 receives a plurality of HTTP compliant requests from client device 410 over a plurality of TCP connections of a client-side LAN. Network gateway device 420 translates the plurality of HTTP compliant requests into a plurality of HTTP non-compliant requests, and sends the HTTP non-compliant requests to server device 430 over a plurality of TCP connections via the server-side WAN. In FIG. 4, the number of TCP connections over which the HTTP compliant requests directed to information resources of server device 430, which are received from client device 410 at network gateway device 420, are equal to the number of TCP connections over which the HTTP non-compliant requests are sent by network gateway device 420 to server device 430 via the server-side WAN.

In FIG. 5, network gateway device 520 receives a plurality of HTTP compliant requests from client device 510 over a plurality of TCP connections via client-side LAN. Network gateway device 520 translates the plurality of HTTP compliant requests into one or more HTTP non-compliant requests, and sends the one or more HTTP non-compliant requests to server device 530 over a single TCP connection via the server-side WAN. In FIG. 5, the number of TCP connections over which the HTTP compliant requests directed to information resources of server device 530, which are received from client device 510 at network gateway device 520, are greater than the number of TCP connections over which the HTTP non-compliant requests are sent by network gateway device 520 to server device 530 via the server-side WAN. Accordingly, FIG. 5 depicts an example mode of operation where network gateway device 520 multiplexes HTTP compliant requests over an individual TCP connection by translating the HTTP compliant requests to an HTTP non-compliant application level protocol.

In FIG. 6, network gateway device 620 receives one or more HTTP compliant requests from client device 610 over one or more TCP connections via client-side LAN. Network gateway device 620 translates the one or more HTTP compliant requests into a plurality of HTTP non-compliant requests, and sends the plurality of HTTP non-compliant requests to server device 630 over a plurality of TCP connections via the server-side WAN. In FIG. 6, the number of TCP connections over which the HTTP compliant requests directed to information resources of server device 630, which are received from client device 610 at network gateway device 620, are less than the number of TCP connections over which the HTTP non-compliant requests are sent by network gateway device 620 to server device 630 via the server side WAN. Accordingly, FIG. 6 depicts an example mode of operation where network gateway device 620 increases parallelism on behalf of client device 610.

In FIG. 7, network gateway device 720 receives a plurality of HTTP compliant requests from a plurality of client devices 710, 712 over a plurality of TCP connections via client-side LAN. In FIG. 7, requests that are directed to server device 730 are depicted by broken lines and requests that are directed to server device 732 are depicted by solid lines. Network gateway device 720 translates the plurality of HTTP compliant requests into a plurality of HTTP non-compliant requests, and routes the plurality of HTTP non-compliant requests to a plurality of target server devices 730, 732. In FIG. 7, the number of TCP connections over which the HTTP compliant requests directed to information resources of server devices 730, 732, which are received from client devices 710, 712 at network gateway device 720, are equal to the number of TCP connections over which the HTTP non-compliant requests are sent by network gateway device 720 to server devices 730, 732 via the server-side WAN.

In FIG. 8, network gateway device 820 receives a plurality of HTTP compliant requests from a plurality of client devices 810, 812 over a plurality of TCP connections via client-side LAN. In FIG. 8, requests that are directed to server device 830 are depicted by broken lines and requests that are directed to server device 832 are depicted by solid lines. Network gateway device 820 translates the plurality of HTTP compliant requests into a plurality of HTTP non-compliant requests, and routes the plurality of HTTP non-compliant requests to a plurality of target server devices 830, 832. In FIG. 8, the number of TCP connections over which the HTTP compliant requests directed to information resources of server device 830, which are received from client devices 810, 812 at network gateway device 820, are greater than the number of TCP connections over which the HTTP non-compliant requests are sent by network gateway device 820 to server device 830 via the server-side WAN. Accordingly, FIG. 8 depicts an example mode of operation where network gateway device 820 multiplexes HTTP compliant requests of a plurality of client devices over an individual TCP connection by translating the HTTP compliant requests to an HTTP non-compliant application level protocol.

In FIG. 9, network gateway device 920 receives a plurality of HTTP compliant requests from a plurality of client devices 910, 912 over a plurality of TCP connections via client-side LAN. In FIG. 9, requests that are directed to server device 930 are depicted by broken lines and requests that are directed to server device 932 are depicted by solid lines. Network gateway device 920 translates the plurality of HTTP compliant requests into a plurality of HTTP non-compliant requests, and routes the plurality of HTTP non-compliant requests to a plurality of target server devices 930, 932. In FIG. 9, the number of TCP connections over which the HTTP compliant requests directed to information resources of server device 932, which are received from client device 912 at network gateway device 920, are less than the number of TCP connections over which the HTTP non-compliant requests are sent by network gateway device 920 to server device 932 via the server side WAN. However, FIG. 9 further depicts number of TCP connections over which the HTTP compliant requests directed to information resources of server device 930, which are received from client devices 910, 912 at network gateway device 920, are greater than the number of TCP connections over which the HTTP non-compliant requests are sent by network gateway device 920 to server device 930 via the server-side WAN. Accordingly, FIG. 9 depicts an example mode of operation where network gateway device 920 increases parallelism on behalf of client device 912 for requests directed at information resources of server device 932, while network gateway device 920 also multiplexes HTTP compliant requests of a plurality of client devices over an individual TCP connection by translating the HTTP compliant requests to an HTTP non-compliant application level protocol.

The example modes of operation described with reference to FIGS. 4-9 may be supported in the response direction by the network gateway device for translating HTTP non-compliant responses received from server devices via the server-side WAN to HTTP compliant responses sent from the network gateway device to the client devices via the client-side LAN. In FIGS. 4-6, HTTP non-compliant responses may be received by the network gateway device, translated, and sent as HTTP compliant responses to the client device that initiated the request. For example, in FIG. 4, the number of TCP connections over which the HTTP non-compliant responses are received at network gateway device 420 from server device 430 may be equal to the number of TCP connections over which the HTTP compliant requests are sent by network gateway device 420 to client device 410 via the client-side LAN. In FIG. 5, the number of TCP connections (e.g., a single TCP connection per server device) over which the HTTP non-compliant responses are received at network gateway device 520 from server device 530 may be less than the number of TCP connections over which the HTTP compliant responses are sent by network gateway device 520 to client device 510 via the client-side LAN. In FIG. 6, the number of TCP connections over which the HTTP non-compliant responses are received at network gateway device 620 from server device 630 may be greater than the number of TCP connections over which the HTTP compliant responses are sent by network gateway device 620 to client device 610 via the client-side LAN.

In FIGS. 7-9, HTTP non-compliant responses may be received from a plurality of server devices, translated to HTTP compliant responses, and routed to client devices that initiated the request. For example, in FIG. 7, the number of TCP connections over which the HTTP non-compliant responses are received from server devices 730, 732 at network gateway device 720 may be equal to the number of TCP connections over which the HTTP compliant responses are sent by network gateway device 720 to client devices 710, 712 via the client-side LAN. In FIG. 8, the number of TCP connections over which the HTTP non-compliant responses received at network gateway device 820 from server device 830 may be less than the number of TCP connections over which the HTTP compliant responses are sent by network gateway device 820 to client device 810 via the client-side LAN. In FIG. 9, the number of TCP connections over which the HTTP non-compliant responses received at network gateway device 920 from server device 932 may be greater than the number of TCP connections over which the HTTP compliant responses are sent by network gateway device 920 to client device 912 via client-side LAN.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A network communications system, comprising:
a network gateway device configured to:
  receive from a client device via a client-side local area network over plural TCP connections established with the client device, an encrypted HTTP compliant request stream including one or more HTTP compliant requests formatted according to an HTTP compliant application level protocol, the encrypted HTTP compliant request stream initiated by the client device over the plural TCP connections with the network gateway device;
  decrypt the encrypted HTTP compliant request stream to obtain a decrypted HTTP compliant request stream;
  translate the decrypted HTTP compliant request stream into a re-encrypted HTTP non-compliant request stream including one or more HTTP non-compliant requests formatted according to an HTTP non-compliant application level protocol; and
  forward the re-encrypted HTTP non-compliant request stream to a server device via a server-side wide area network by multiplexing the re-encrypted HTTP non-compliant request stream over a lesser number of TCP connections than the plural TCP connections over which the encrypted HTTP compliant request stream was received from the client device;
  receive from the server device via the server-side wide area network over the lesser number of TCP connections, an encrypted HTTP non-compliant response stream including one or more HTTP non-compliant responses formatted according to the HTTP non-compliant application level protocol, the one or more HTTP non-compliant responses responsive to the one or more HTTP non-compliant requests;
  decrypt the encrypted HTTP non-compliant response stream to obtain a decrypted HTTP non-compliant response stream;
  translate the decrypted HTTP non-compliant response stream into a re-encrypted HTTP compliant response stream including one or more HTTP compliant responses formatted according to the HTTP compliant application level protocol; and
  forward the re-encrypted HTTP compliant response stream to the client device via the client-side local area network by de-multiplexing the re-encrypted HTTP compliant request stream over the plural TCP connections.

2. The system of claim 1, wherein the network gateway device is further configured to:
  translate the HTTP compliant request stream at least in part by compressing respective headers of the one or more HTTP compliant requests to the one or more HTTP non-compliant requests; and
  translate the HTTP non-compliant response stream at least in part by uncompressing respective headers of the one or more HTTP non-compliant responses to the one or more HTTP compliant responses.

3. The system of claim 1, wherein the network gateway device includes a translator module, the translator module including one or more of:
  a rewriter module configured to modify one or more of a URL, a header, or a data payload of the HTTP compliant request stream or the HTTP non-compliant response stream;
  a stream composer configured to translate the HTTP compliant request stream into the HTTP non-compliant request stream;
  a stream decomposer configured to translate the HTTP non-compliant response stream into the HTTP compliant response stream; and
  a rules engine configured to instruct one or more of the rewriter module, stream composer, or stream decomposer to perform respective actions in accordance with the one or more rules upon satisfaction of a respective condition associated with each rule.

4. The system of claim 1, wherein the network gateway device is further configured to:
  identify a performance parameter of an existing TCP connection between the server device and the network gateway device; and
  initiate a new TCP connection between the server device and the network gateway device based, at least in part, on the performance parameter of the existing TCP connection exceeding a threshold.

5. The system of claim 1, wherein the client device is one of a plurality of client devices of the client-side local area network, and the server device is one of a plurality of server devices of the server-side wide area network, wherein the network gateway device is further configured to:
  receive a plurality of HTTP compliant request streams from the plurality of client devices via the client-side local area network;
  translate the plurality of HTTP compliant request streams into a plurality of HTTP non-compliant request streams; and
  forward the plurality of HTTP non-compliant request streams to a plurality of server devices via the server-side wide area network.

6. The system of claim 1, wherein the network gateway device is further configured to:
  receive an indication the client device or the server device indicating a supported protocol, the supported protocol including at least one of the HTTP compliant application level protocol and the HTTP non-compliant application level protocol; and
  send an indication of one or more application level protocols supported by the network gateway device to the client device or the server device, the one or more application level protocols supported by the network gateway device including the HTTP compliant application level protocol and the HTTP non-compliant application level protocol.

7. A network communications method for a network gateway device, comprising:

receiving from a client device via a client-side local area network over plural TCP connections established with the client device, an HTTP compliant request stream including one or more HTTP compliant requests formatted according to an HTTP compliant application level protocol, the HTTP compliant request stream initiated by the client device over the plural TCP connections;

translating the HTTP compliant request stream into an HTTP non-compliant request stream including one or more HTTP non-compliant requests formatted according to an HTTP non-compliant application level protocol by multiplexing the HTTP non-compliant request stream for transmission over a lesser number of TCP connections than the plural TCP connections over which the HTTP compliant request stream was received from the client device;

forwarding the HTTP non-compliant request stream to a server device via a server-side wide area network over the lesser number of TCP connections;

receiving from the server device via the server-side wide area network, an HTTP non-compliant response stream including one or more HTTP non-compliant responses formatted according to the HTTP non-compliant application level protocol;

translating the HTTP non-compliant response stream into an HTTP compliant response stream including one or more HTTP compliant responses formatted according to the HTTP compliant application level protocol by de-multiplexing the HTTP non-compliant response stream for transmission over the plural TCP connections; and forwarding the HTTP compliant response stream to the client device via the client-side local area network over the plural TCP connections.

8. The method of claim 7, further comprising:

translating the HTTP compliant request stream at least in part by compressing respective headers of the one or more HTTP compliant requests to the one or more HTTP non-compliant requests; and translating the HTTP non-compliant response stream at least in part by uncompressing respective headers of the one or more HTTP non-compliant responses to the one or more HTTP compliant responses.

9. The method of claim 7, further comprising:

decrypting the HTTP compliant request stream prior to translating the HTTP compliant request stream;

re-encrypting the HTTP non-compliant request stream prior to forwarding the HTTP noncompliant request stream to the server device;

decrypting the HTTP non-compliant response stream prior to translating the HTTP noncompliant response stream; and re-encrypting the HTTP compliant response stream prior to forwarding the HTTP compliant response stream to the client device.

10. The method of claim 9, further comprising:

buffering the one or more HTTP compliant requests of HTTP compliant request stream prior to translating the HTTP compliant request stream; or buffering the one or more HTTP non-compliant responses of the HTTP non-compliant response stream prior to translating the HTTP non-compliant response stream.

11. The method of claim 7, further comprising:

receiving a plurality of HTTP compliant request streams from a plurality of client devices via the client-side local area network;

translating the plurality of HTTP compliant request streams into a plurality of HTTP non-compliant request streams; and forwarding the plurality of HTTP non-compliant request streams to a plurality of server devices via the server-side wide area network.

12. The method of claim 7, further comprising:

identifying a performance parameter of an existing TCP connection with the server device; and initiating a new TCP connection with the server device based, at least in part, on the performance parameter of the existing TCP connection exceeding a threshold.

13. A network gateway device for facilitating a client-side local area network having one or more client devices, the network gateway device configured to:

receive from the one or more client devices via the client-side local area network, one or more encrypted HTTP compliant request streams from each of the one or more client devices over plural TCP connections established with each of the one or more client devices, each encrypted HTTP compliant request stream including one or more HTTP compliant requests formatted according to an HTTP compliant application level protocol by a respective client device, each encrypted HTTP compliant request stream initiated by a respective client device over respective plural TCP connections with the network gateway device;

decrypt the one or more encrypted HTTP compliant request streams to obtain one or more decrypted HTTP compliant request streams;

translate the one or more decrypted HTTP compliant request streams into one or more re-encrypted HTTP non-compliant request streams addressed to one or more server device, each re-encrypted HTTP non-compliant request stream including one or more HTTP non-compliant requests formatted according to an HTTP non-compliant application level protocol;

route the one or more re-encrypted HTTP non-compliant request streams to the one or more server devices via a server-side wide area network by multiplexing the one or more re-encrypted HTTP non-compliant request streams over a lesser number of TCP connections than the plural TCP connections;

receive from the one or more server devices via the server-side wide area network, one or more encrypted HTTP non-compliant response streams, each encrypted HTTP non-compliant response stream including one or more HTTP non-compliant responses formatted according to the HTTP non-compliant application level protocol;

decrypt the one or more encrypted HTTP non-compliant response streams to obtain one or more decrypted HTTP non-compliant response streams;

translate the one or more decrypted HTTP non-compliant response streams into one or more re-encrypted HTTP compliant response streams addressed to the one or more client devices, each re-encrypted HTTP compliant response stream including one or more HTTP compliant responses formatted according to the HTTP compliant application level protocol; and route the one or more re-encrypted HTTP compliant response streams to the one or more client devices via the client-side local area network by de-multiplexing the one or more re-encrypted HTTP compliant request streams over the plural TCP connections established with each of the one or more client devices.

\* \* \* \* \*